United States Patent
Rathay et al.

(10) Patent No.: US 10,982,553 B2
(45) Date of Patent: Apr. 20, 2021

(54) TIP RAIL WITH COOLING STRUCTURE USING THREE DIMENSIONAL UNIT CELLS

(71) Applicant: General Electric Company, Schenectady, NY (US)

(72) Inventors: Nicholas William Rathay, Rock City Falls, NY (US); William Dwight Gerstler, Niskayuna, NY (US); Mark Steven Honkomp, Taylors, SC (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 16/207,995

(22) Filed: Dec. 3, 2018

(65) Prior Publication Data

US 2020/0173291 A1 Jun. 4, 2020

(51) Int. Cl.
*F01D 5/20* (2006.01)
*F01D 5/18* (2006.01)

(52) U.S. Cl.
CPC .............. *F01D 5/20* (2013.01); *F01D 5/187* (2013.01); *F05D 2240/307* (2013.01); *F05D 2260/202* (2013.01)

(58) Field of Classification Search
CPC ............. F01D 5/20; F01D 11/08; F01D 5/187
See application file for complete search history.

(56) References Cited

U.S. PATENT DOCUMENTS

| | | |
|---|---|---|
| 3,228,464 A | 1/1966 | Stein et al. |
| 4,487,550 A | 12/1984 | Horvath et al. |
| 5,660,523 A | 8/1997 | Lee |
| 5,941,303 A | 8/1999 | Gowan et al. |
| 6,086,328 A * | 7/2000 | Lee .......................... F01D 5/18 415/115 |

(Continued)

FOREIGN PATENT DOCUMENTS

| | | |
|---|---|---|
| CN | 102721303 B | 4/2012 |
| JP | 2005201079 A | 7/2005 |

(Continued)

OTHER PUBLICATIONS

Da Silva, et al., "Construtcal Multi-Scale Tree-Shaped Heat Exhchangers", Journal of Applied Physics, Aug. 1, 2004, pp. 1709-1718, vol. 96, No. 3.

(Continued)

*Primary Examiner* — Eldon T Brockman
*Assistant Examiner* — Michael L Sehn
(74) *Attorney, Agent, or Firm* — James Pemrick; Hoffman Warnick LLC

(57) ABSTRACT

A tip for a turbine component, turbine rotor blade or tip of a blade, is disclosed. The tip includes a tip plate configured to be coupled at a tip end of an airfoil chamber; and a tip rail extending radially from the tip plate, the tip rail disposed near or at a periphery of the tip plate. The trip rail includes a cooling structure constituting at least a portion of the tip rail. The cooling structure is in fluid communication with the airfoil chamber, and includes a plurality of repeating, three dimensional unit cells. Each unit cell defines a flow passage that is in fluid communication with the flow passage of at least one other unit cell. The flow passages of the 3D unit cells create a tortuous cooling passage in at least a portion of the tip rail.

17 Claims, 14 Drawing Sheets

(56) References Cited

U.S. PATENT DOCUMENTS

| | | | |
|---|---|---|---|
| 6,135,715 A * | 10/2000 | Correia | F01D 5/20 |
| | | | 416/97 R |
| 7,069,980 B2 | 7/2006 | Hofbauer | |
| 7,922,451 B1 * | 4/2011 | Liang | F01D 5/20 |
| | | | 416/97 R |
| 7,997,865 B1 * | 8/2011 | Liang | F01D 5/20 |
| | | | 416/92 |
| 8,235,101 B2 | 8/2012 | Taras et al. | |
| 8,801,377 B1 * | 8/2014 | Liang | F01D 5/186 |
| | | | 416/97 R |
| 2013/0276469 A1 | 10/2013 | Dryzun | |
| 2014/0251585 A1 | 9/2014 | Kusuda et al. | |
| 2016/0090848 A1 | 3/2016 | Engeli et al. | |
| 2016/0202003 A1 | 7/2016 | Gerstler et al. | |
| 2017/0248372 A1 | 8/2017 | Erno et al. | |
| 2017/0363363 A1 | 12/2017 | Lassini et al. | |
| 2017/0367218 A1 | 12/2017 | Gerstler et al. | |

FOREIGN PATENT DOCUMENTS

| | | |
|---|---|---|
| WO | 2017167615 A1 | 10/2017 |
| WO | 2017192508 A1 | 11/2017 |

OTHER PUBLICATIONS

Kim et al., "Two-Phase Flow Distribution of Air-Water Annular in a Parallel Flow Heat Exchanger", International Journal of Multiphase Flow 32, 2006, pp. 1340-1353.

* cited by examiner

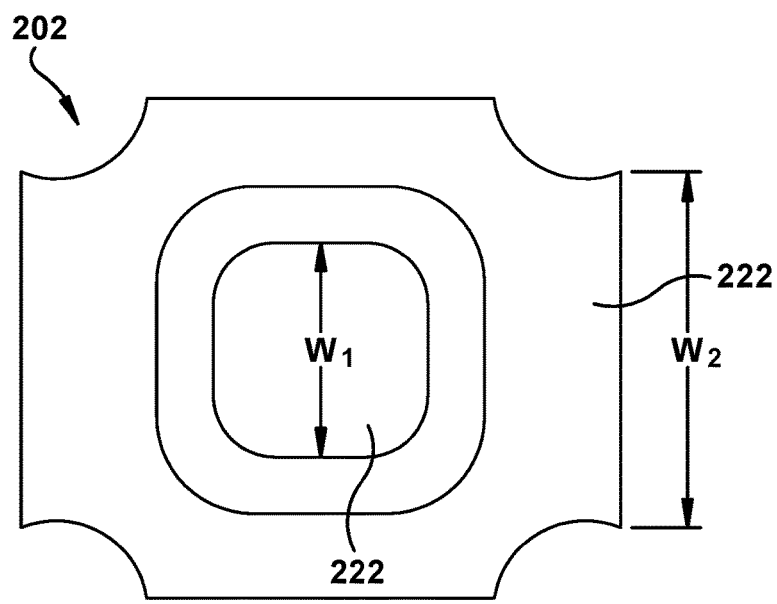
Fig. 8
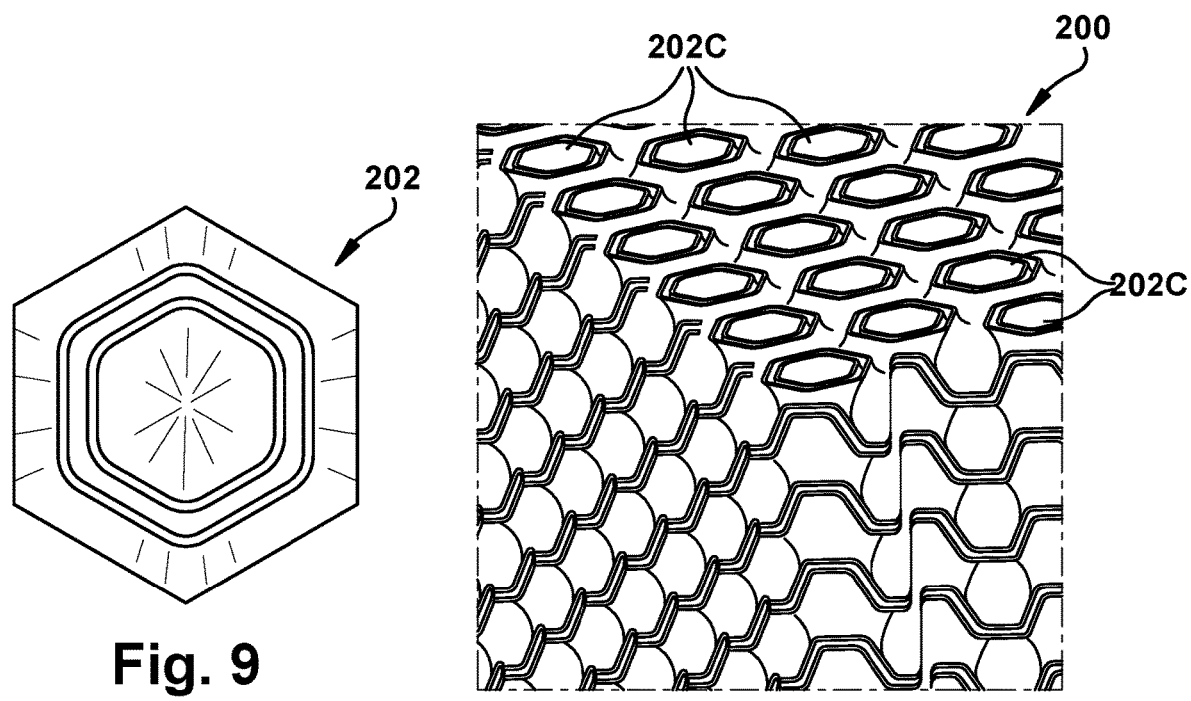
Fig. 9
Fig. 10

TIP RAIL WITH COOLING STRUCTURE USING THREE DIMENSIONAL UNIT CELLS

BACKGROUND OF THE INVENTION

The disclosure relates generally to turbine components, and more particularly, to a turbine component, turbine rotor blade or tip that includes a tip rail including a cooling feature employing three dimensional unit cells to create a tortuous cooling passage.

In a gas turbine engine, it is well known that air is pressurized in a compressor and used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disk. Each blade typically includes a dovetail that permits assembly and disassembly of the blade in a corresponding dovetail slot in the rotor disk, as well as an airfoil that extends radially outwardly from the dovetail.

The airfoil has a generally concave pressure side wall and generally convex suction side wall extending axially between corresponding leading and trailing edges and radially between a root and a tip. It will be understood that the blade tip is spaced closely to a radially outer turbine shroud for minimizing leakage therebetween of the combustion gases flowing downstream between the turbine blades. Maximum efficiency of the engine is obtained by minimizing the tip clearance or gap such that leakage is prevented, but this strategy is limited somewhat by the different thermal and mechanical expansion and contraction rates between the turbine rotor blades and the turbine shroud and the motivation to avoid having excessive tip rub against the shroud during operation.

In addition, because turbine rotor blades are bathed in hot combustion gases, effective cooling is required for ensuring a useful part life. Typically, the blade airfoils are hollow and disposed in fluid communication with the compressor so that a portion of pressurized air bled therefrom is received for use in cooling the airfoils, as a coolant. Airfoil cooling is quite sophisticated and may be employed using various forms of internal cooling channels and features, as well as cooling holes through the outer walls of the airfoil for discharging the cooling air. Nevertheless, airfoil tips are particularly difficult to cool since they are located directly adjacent to the turbine shroud and are heated by the hot combustion gases that flow through the tip gap. Accordingly, a portion of the air channeled inside the airfoil of the blade is typically discharged through the tip for the cooling thereof.

It will be appreciated that conventional blade tips include several different geometries and configurations that are meant to prevent leakage and increase cooling effectiveness. Conventional blade tips, however, have certain shortcomings, including a general failure to adequately reduce leakage and/or allow for efficient tip cooling that minimizes the use of efficiency-robbing compressor bypass air. One approach, referred to as a "squealer tip" arrangement, provides a radially extending rail that may rub against the tip shroud. The rail reduces leakage and therefore increases the efficiency of turbine engines.

However, the rail of the squealer tip is subjected to a high heat load and is difficult to effectively cool—it is frequently one of the hottest regions in the blade. Tip rail impingement cooling delivers coolant through the top of the rail, and has been demonstrated to be an effective method of rail cooling. However, there are numerous challenges associated with exhausting a coolant through the top of the rail. For example, backflow pressure margin requirements are difficult to satisfy with this arrangement (especially on the pressure side wall, where there are holes connected to low and high pressure regions—the top and pressure side walls of the rail, respectively). Hence, it is a challenge to create losses in the tip passage to back-pressure the coolant flow, and at the same time, sufficiently cool the rail, since losses reduce the amount of cooling fluid used in this region. Further, the outlet holes must exhibit rub tolerance yet provide sufficient cooling to the rails. For example, the outlet holes must be tolerant of tip rub but also sufficiently large that dust cannot clog them.

Another challenge with tip cooling is accommodating the different temperatures observed in different areas of the tip rail. For example, the rail in the pressure side wall and aft region of the suction side wall are typically hotter than other areas. Current tip rail cooling configurations create only discrete cooling passages within the rail that create localized cooling, but also create additional undesired temperature gradients. Further, as the tip rail rubs away, the current discrete cooling hole arrangements' performance can become unreliable.

Additive manufacturing has been employed to create cooling passages that provide cooling in a tip rail. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. However, current AM applications for tip rail cooling have only provided the aforementioned discrete cooling passages that create localized cooling, undesired temperature gradients, and inability to maintain cooling performance during rub.

BRIEF DESCRIPTION OF THE INVENTION

A first aspect of the disclosure provides a turbine component, comprising an airfoil having: a base, a tip disposed opposite the base, and a pressure side wall and a suction side wall extending between a leading edge and a trailing edge thereof; an airfoil chamber disposed within the airfoil, the airfoil chamber configured to supply a coolant through the airfoil; a tip plate at a tip end of the airfoil chamber; a tip rail extending radially from the tip plate, the tip rail disposed near or at a periphery of the tip plate; and a cooling structure constituting at least a portion of the tip rail, the cooling structure in fluid communication with the airfoil chamber, the cooling structure including a plurality of repeating, three dimensional unit cells, each unit cell defining a flow passage that is in fluid communication with the flow passage of at least one other unit cell, wherein the flow passages of the plurality of repeating, three dimensional unit cells create a tortuous cooling passage in the at least the portion of the tip rail.

A second aspect of the disclosure provides a turbine rotor blade for a gas turbine engine, the turbine rotor blade comprising: an airfoil having: a base, a tip disposed opposite the base, and a pressure side wall and a suction side wall extending between a leading edge and a trailing edge thereof; an airfoil chamber disposed within the airfoil, the airfoil chamber configured to supply a coolant through the airfoil; a tip plate at a tip end of the airfoil chamber; a tip rail extending radially from the tip plate, the tip rail disposed near or at a periphery of the tip plate; and a cooling structure constituting at least a portion of the tip rail, the cooling structure in fluid communication with the airfoil chamber, the cooling structure including a plurality of repeating, three dimensional unit cells, each unit cell defining a flow passage that is in fluid communication with the flow passage of at least one other unit cell, wherein the flow passages of the plurality of repeating, three dimensional unit cells create a tortuous cooling passage in the at least the portion of the tip rail.

A third aspect of the disclosure provides a tip for a turbine rotor blade for a gas turbine engine, the turbine rotor blade including an airfoil having an airfoil chamber disposed within the airfoil and configured to supply a coolant through the airfoil, the tip comprising: a tip plate configured to be coupled at a tip end of the airfoil chamber; a tip rail extending radially from the tip plate, the tip rail disposed near or at a periphery of the tip plate; and a cooling structure constituting at least a portion of the tip rail, the cooling structure in fluid communication with the airfoil chamber, the cooling structure including a plurality of repeating, three dimensional unit cells, each unit cell defining a flow passage that is in fluid communication with the flow passage of at least one other unit cell, wherein the flow passages of the plurality of repeating, three dimensional unit cells create a tortuous cooling passage in the at least the portion of the tip rail.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 8 shows a side view of an illustrative planar trifurcated unit cell for use in a cooling structure according to another embodiment of the disclosure.

FIG. 9 shows a side view of an illustrative curved trifurcated 3D unit cell for use in a cooling structure according to an embodiment of the disclosure.

FIG. 10 shows a perspective view of a plurality of 3D unit cells from FIG. 9 for use in a cooling structure according to embodiments of the disclosure.

Figure 1:
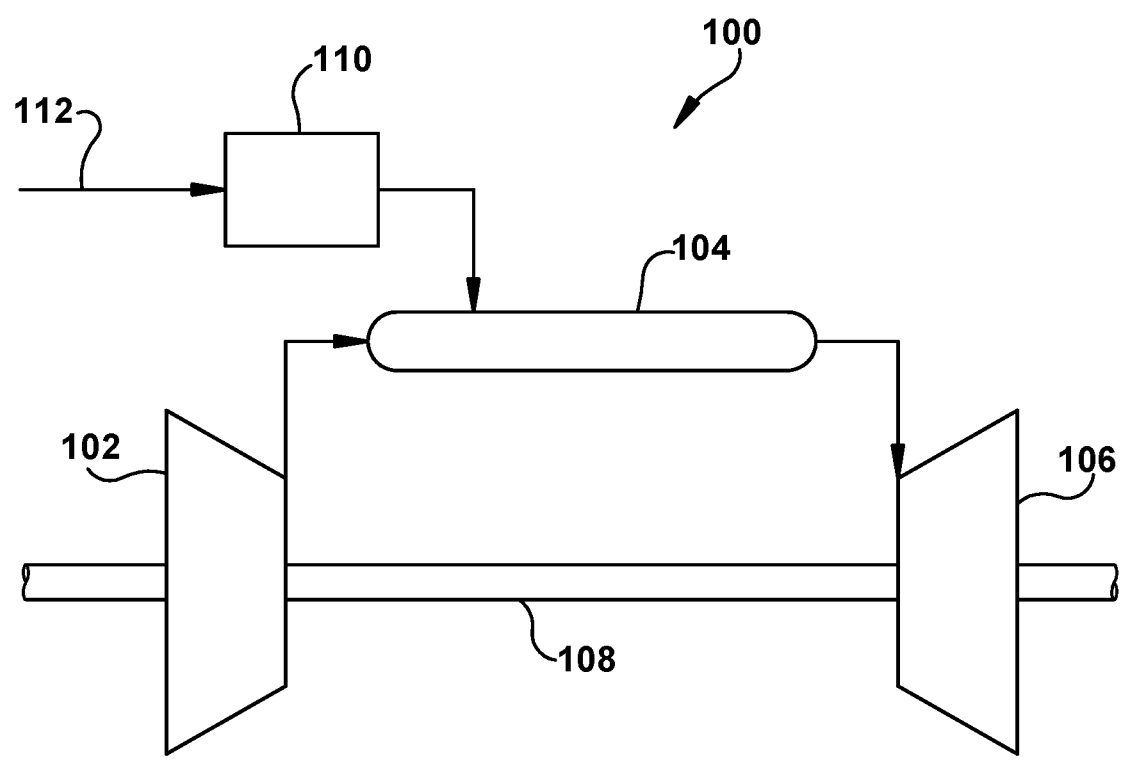
FIG. 1 shows a schematic diagram of an embodiment of an illustrative gas turbine system.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a turbomachine system and relative to a turbine component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a working fluid, such as combustion gases through the turbine engine or, for example, the flow of air through the combustor or coolant through or by one of the turbine's components. The term "downstream" corresponds to the direction of flow of the fluid, and the term "upstream" refers to the direction opposite to the flow. The terms "forward" and "aft," without any further specificity, refer to directions, with "forward" referring to an upstream portion of the part being referenced, i.e., closest to compressor, and "aft" referring to a downstream portion of the part being referenced, i.e., farthest from compressor. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, embodiments of the disclosure provide a turbine component, turbine rotor blade or a tip including a tip rail. A cooling structure constitutes at least a portion of the tip rail. The cooling structure in the tip rail is in fluid communication with an airfoil chamber, and includes a plurality of repeating, three dimensional (3D) unit cells. Each 3D unit cell includes a flow passage defined therein that is in fluid communication with the flow passage of at least one other unit cell. The flow passages of the plurality of repeating 3D unit cells, collectively, create a tortuous cooling passage in the at least the portion of the tip rail. The tortuous cooling passage improves cooling efficiency. As will be described, the cooling structure and 3D unit cells can be positioned in any of a number of locations relative to the tip rail, allowing for more effective cooling and customization of the location of the cooling. More efficient cooling allows for increased firing temperatures or reduced coolant flow. The potential for reduced tip rail temperatures also may increase part life. The cooling structure also addresses dust clogging by providing many cooling passage openings, e.g., in a radially outward facing rail face of tip rail and/or side faces of a tip rail.

The cooling structure is capable of being additively manufactured, with or separately from the rest of the turbine component, turbine rotor blade or tip. Additive manufacturing (AM) includes a wide variety of processes of producing a component through the successive layering of material rather than the removal of material. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component. In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two-dimensional slice of the component geometry can be fused by selectively melting the metal powder. The melting may be performed by a high-powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two-dimensional layer, and the process repeats until the component is completely formed.

FIG. 1 is a schematic diagram of an embodiment of a turbomachine system, such as a gas turbine system 100. System 100 includes a compressor 102, a combustor 104, a turbine 106, a shaft 108 and a fuel nozzle 110. In an embodiment, system 100 may include a plurality of compressors 102, combustors 104, turbines 106, shafts 108 and fuel nozzles 110. Compressor 102 and turbine 106 are coupled by shaft 108. Shaft 108 may be a single shaft or a plurality of shaft segments coupled together to form shaft 108.

In one aspect, combustor 104 uses liquid and/or gas fuel, such as natural gas or a hydrogen rich synthetic gas, to run the engine. For example, fuel nozzles 110 are in fluid communication with an air supply and a fuel supply 112. Fuel nozzles 110 create an air-fuel mixture, and discharge the air-fuel mixture into combustor 104, thereby causing a combustion that creates a hot pressurized exhaust gas. Combustor 104 directs the hot pressurized gas through a transition piece into a turbine stationary nozzle (or "stage one nozzle") (also referred to as a "vane"), and other stages of turbine rotor blades and stationary nozzles causing turbine 106 rotation. The rotation of turbine 106 causes shaft 108 to rotate, thereby compressing the air as it flows into compressor 102. In an embodiment, hot gas path components, including, but not limited to, shrouds, diaphragms, nozzles, blades and transition pieces are located in turbine 106, where hot gas flow across the components causes creep, oxidation, wear and thermal fatigue of turbine parts. Controlling the temperature of the hot gas path components can reduce distress modes in the components. The efficiency of the gas turbine increases with an increase in firing temperature in turbine system 100. As the firing temperature increases, the hot gas path components need to be properly cooled to meet service life. Components with improved arrangements for cooling of tip rails proximate to the hot gas path are discussed in detail herein. Although the following discussion primarily focuses on gas turbines, the concepts discussed are not limited to gas turbines.

Figure 2:
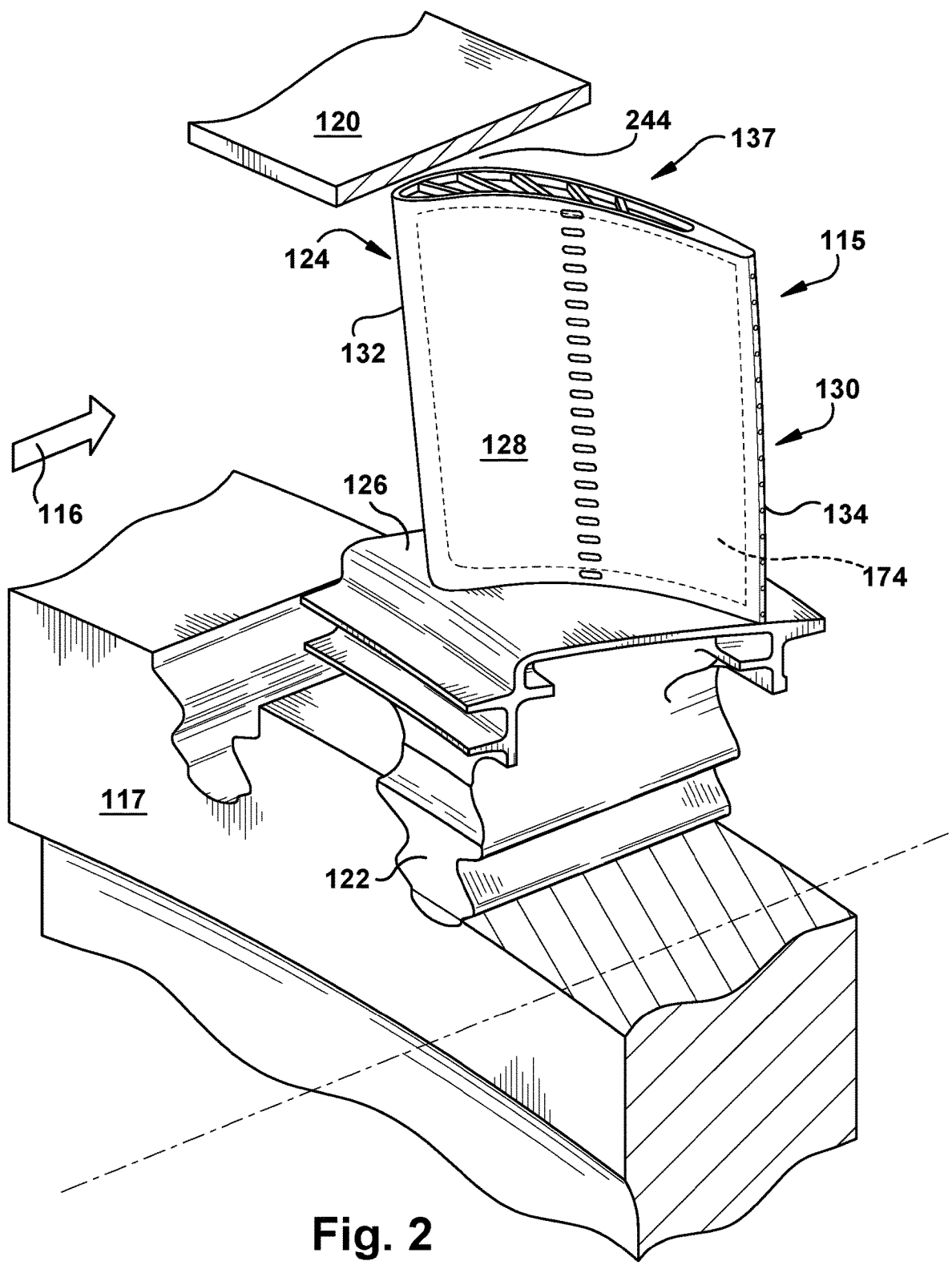
FIG. 2 shows a perspective view of an illustrative turbine component in the form of a turbine rotor blade.

FIG. 2 is a perspective view of an illustrative conventional turbine component in the form of a turbine rotor blade 115, which is positioned in a turbine of a gas turbine or combustion engine. It will be appreciated that the turbine is mounted downstream from a combustor for receiving hot combustion gases 116 therefrom. The turbine, which is axisymmetric about an axial centerline axis, includes a rotor disk 117 and a plurality of circumferentially spaced apart turbine rotor blades (only one of which is shown) extending radially outwardly from rotor disk 117 along a radial axis. An annular, stationary turbine shroud 120 is suitably joined to a stationary stator casing (not shown) and surrounds turbine rotor blades 115 such that a relatively small clearance or gap 244 remains therebetween that limits leakage of combustion gases during operation.

Each turbine rotor blade 115 generally includes a base 122 (also referred to as root or dovetail) which may have any conventional form, such as an axial dovetail configured for being mounted in a corresponding dovetail slot in the perimeter of rotor disk 117. A hollow airfoil 124 is integrally joined to base 122 and extends radially or longitudinally outwardly therefrom. Turbine rotor blade 115 also includes an integral platform 126 disposed at the junction of airfoil 124 and base 122 for defining a portion of the radially inner flow path for combustion gases 116. It will be appreciated that turbine rotor blade 115 may be formed in any conventional manner, and is typically a one-piece casting, an additively manufactured part, or may include an additively manufactured tip 137 (or tip 190 (FIGS. 4-21) formed according to embodiments of the disclosure) joined to a cast blade base section. It will be seen that airfoil 124 preferably includes a generally concave pressure side wall 128 and a circumferentially or laterally opposite, generally convex suction side wall 130 extending axially between opposite leading and trailing edges 132 and 134, respectively. Side walls 128 and 130 also extend in the radial direction from platform 126 to a radially outer blade tip or, simply, tip 137.

Figure 3:
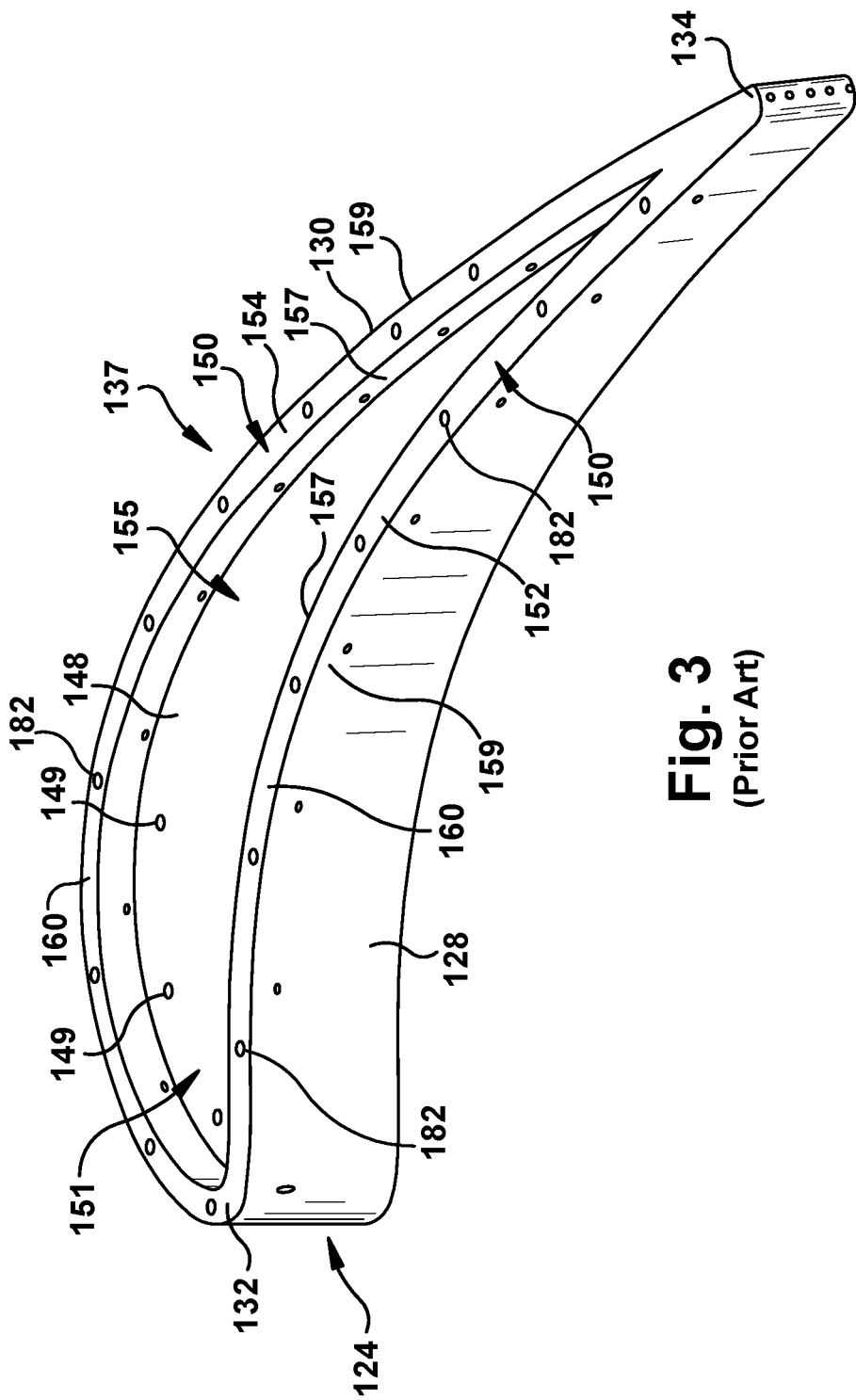
FIG. 3 shows a close-up perspective view of a tip of a turbine rotor blade.

FIG. 3 provides a close-up, perspective view of a conventional turbine blade tip 137. In general, blade tip 137 is disposed opposite base 122 (FIG. 2) and includes a tip plate 148 defining an outwardly facing tip end 151 between pressure side wall 128 and suction side wall 130. Tip plate 148 typically bounds internal cooling passages, which will be simply referenced herein as an "airfoil chamber" 174 (in phantom in FIG. 2), that are disposed within airfoil 124, and are defined between pressure side wall 128 and suction side wall 130 of airfoil 124. The airfoil chamber is configured to supply a coolant through airfoil 124, e.g., in a radial direction. That is, coolant, such as compressed air bled from the compressor, may be circulated through the airfoil chamber during operation. Airfoil chamber 174 (FIG. 2) may include any now known or later developed coolant carrying passages or circuits including but not limited to: cooling passages, impingement sleeves or elements, connecting passages, flow passages, pedestals, etc. Tip plate 148 may be integral to turbine rotor blade 115 (FIG. 2), or it may be welded/brazed into place as part of tip 137, after the blade is cast.

Due to certain performance advantages, such as reduced leakage flow, blade tips 137 frequently include a tip rail, or simply, rail 150. Coinciding with pressure side wall 128 and suction side wall 130, rail 150 may be described as including a pressure side wall rail 152 and a suction side wall rail 154, respectively. Generally, pressure side wall rail 152 extends radially outwardly from tip plate 148 and extends from leading edge 132 to trailing edge 134 of airfoil 124. As illustrated, the path of pressure side wall rail 152 is adjacent to or near the outer radial edge of pressure side wall 128 (i.e., at or near the periphery of tip plate 148 such that it aligns with the outer radial edge of the pressure side wall 128). Similarly, as illustrated in FIG. 3, suction side wall rail 154 extends radially outwardly from tip plate 148 and extends from leading edge 132 to trailing edge 134 of airfoil 124. The path of suction side wall rail 154 is adjacent to or near the outer radial edge of suction side wall 130 (i.e., at or near the periphery of the tip plate 148 such that it aligns with the outer radial edge of the suction side wall 130). Both pressure side wall rail 152 and suction side wall rail 154 may be described as having an inner rail surface 157, an outer rail surface 159 and a radially outward facing rail surface 160 between inner rail surface 157 and outer rail surface 159. It should be understood though that rail(s) may not necessarily follow the pressure or suction side wall rails. That is, in alternative types of tips in which the present disclosure may be used, tip rails 150 may be moved away from the edges of tip plate 148 and may not extend to trailing edge 134. In other applications, more than one tip rail, e.g., 2-3 rails in aviation applications, may be used. Embodiments of the disclosure are equally applicable to these other applications.

Formed in this manner, it will be appreciated that tip rail 150 defines a tip pocket 155 at tip 137 of turbine rotor blade 115. As one of ordinary skill in the art will appreciate, a tip 137 configured in this manner, i.e., one having this type of tip pocket 155, is often referred to as a "squealer tip" or a tip having a "squealer pocket or flow passage." The height and width of pressure side wall rail 152 and/or suction side wall rail 154 (and thus the depth of tip pocket 155) may be varied depending on best performance and the size of the overall turbine assembly. It will be appreciated that tip plate 148 forms the floor of tip pocket 155 (i.e., the inner radial boundary of the flow passage), tip rail 150 forms the side walls of tip pocket 155, and tip pocket 155 remains open through an outer radial face, which, once installed within a turbine engine, is bordered closely by annular, stationary turbine shroud 120 (see FIG. 2) that is slightly radially offset therefrom. Radially outward facing rail surface 160 of rail 150 may rub against annular, stationary turbine shroud 120. Typically, tip rail may include one or more cooling passage openings 182 through radially outward facing rail surface 160 to allow coolant from airfoil chamber 174 (FIG. 2) to cool tip rail 137. In addition, tip plate 148 may include one or more tip plate coolant passages 149 extending from a portion of airfoil chamber 174 through tip plate 148 into tip pocket 155 defined within tip rail 137.

Figure 4:
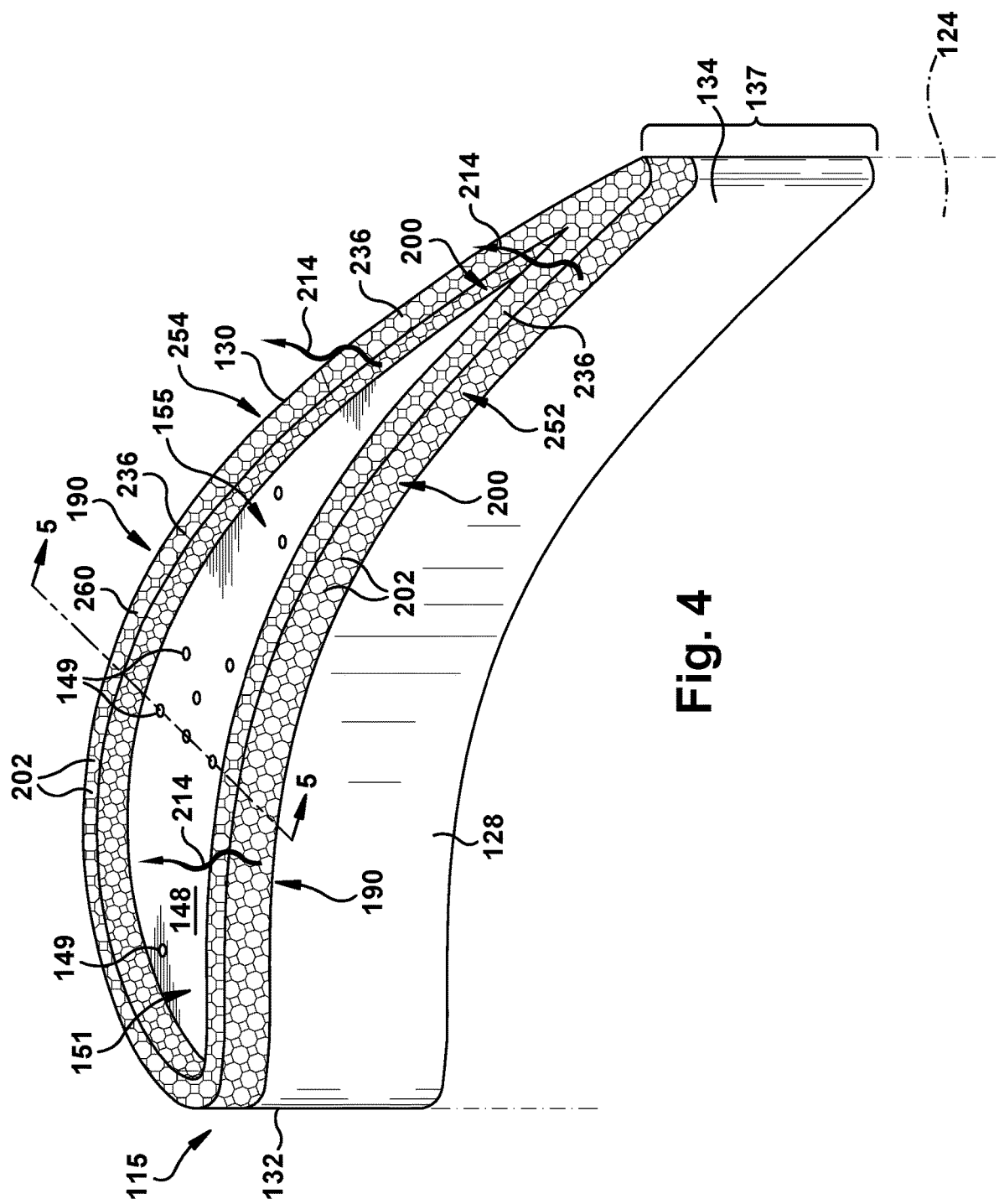
FIG. 4 shows a perspective view of a turbomachine component, turbine rotor blade and tip including a cooling structure including repeated three dimensional (3D) unit cells according to embodiments of the disclosure.
Figure 5:
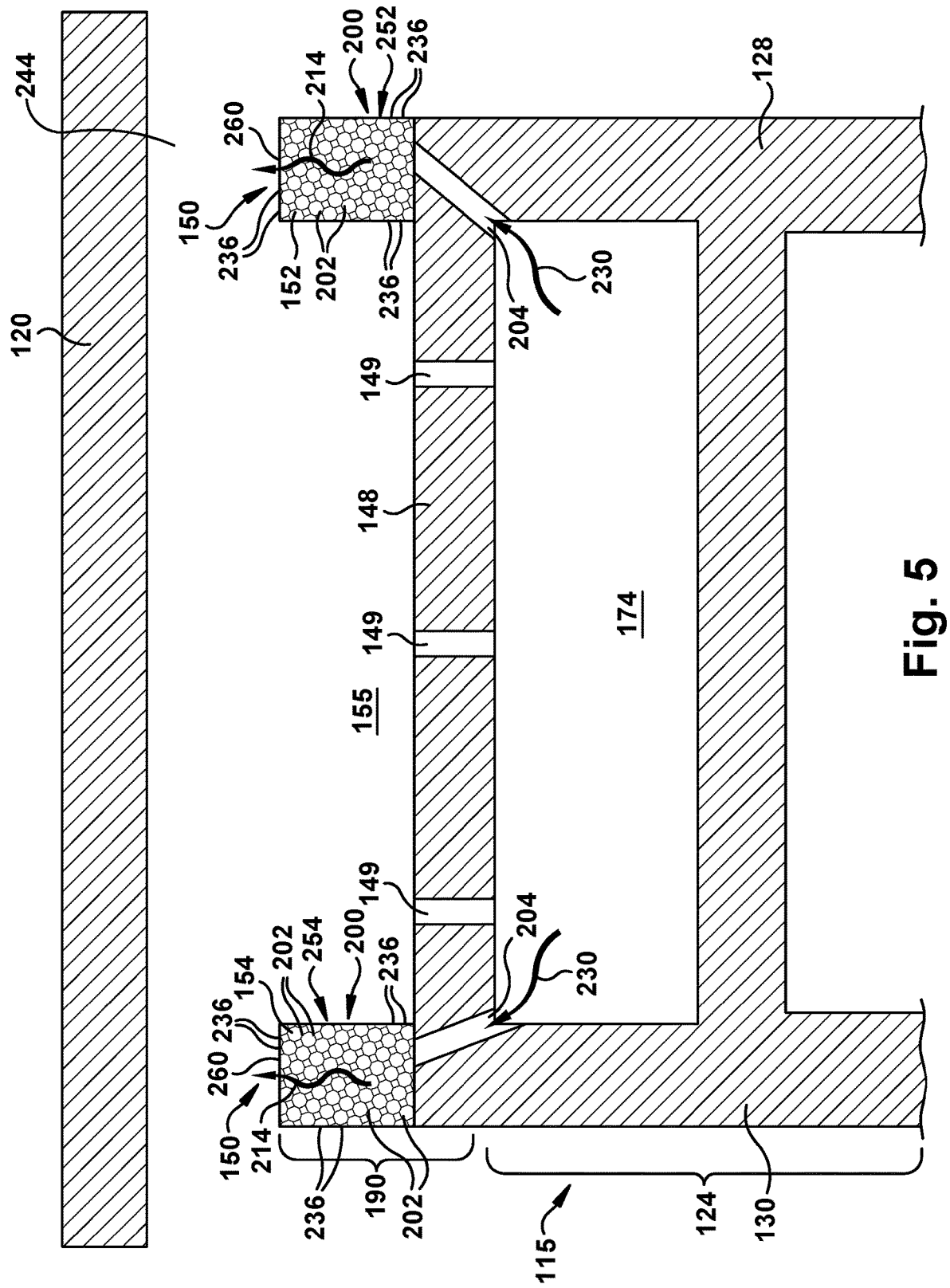
FIG. 5 shows a partial cross-sectional view along line 5-5 of the tip in FIG. 4.

Referring to FIG. 4, a perspective view of a tip 190 according to one embodiment of the disclosure is illustrated. FIG. 5 shows a cross-sectional view along line 5-5 in FIG. 4. Although shown in the form of tip 190, it is understood that the teachings of the disclosure may be applied as a turbine component, turbine rotor blade 115 or a tip 190. In contrast to tip rail 137 as shown in FIG. 3, embodiments of the disclosure employ a cooling structure 200 constituting at least a portion of tip rail 190. That is, cooling structure 200 replaces at least a portion of tip rail 137, as shown in FIG. 3. In the FIGS. 4 and 5 embodiment, cooling structure 200 replaces an entirety of tip rail 190 extending radially from tip plate 148. That is, cooling structure 200 provides a pressure side wall rail 252 and suction side wall rail 254, and replaces inner rail surface 157 (FIG. 3), outer rail surface 159 (FIG. 3) and radially outward facing rail surface 160 (FIG. 3) with faces that include cooling passage openings 236, described herein. As shown in FIG. 5, cooling structure 200 is also in fluid communication with airfoil chamber 174, e.g., via one or more connector passage(s) 204. That is, one or more connector passage(s) 204 may fluidly couple airfoil chamber 174 and cooling structure 200. Any number of connector passage(s) 204 may be employed, and may be routed in any desired fashion, e.g., to provide cooling in side walls 128 and/or 130 or other parts of tip 190.

Figure 6:
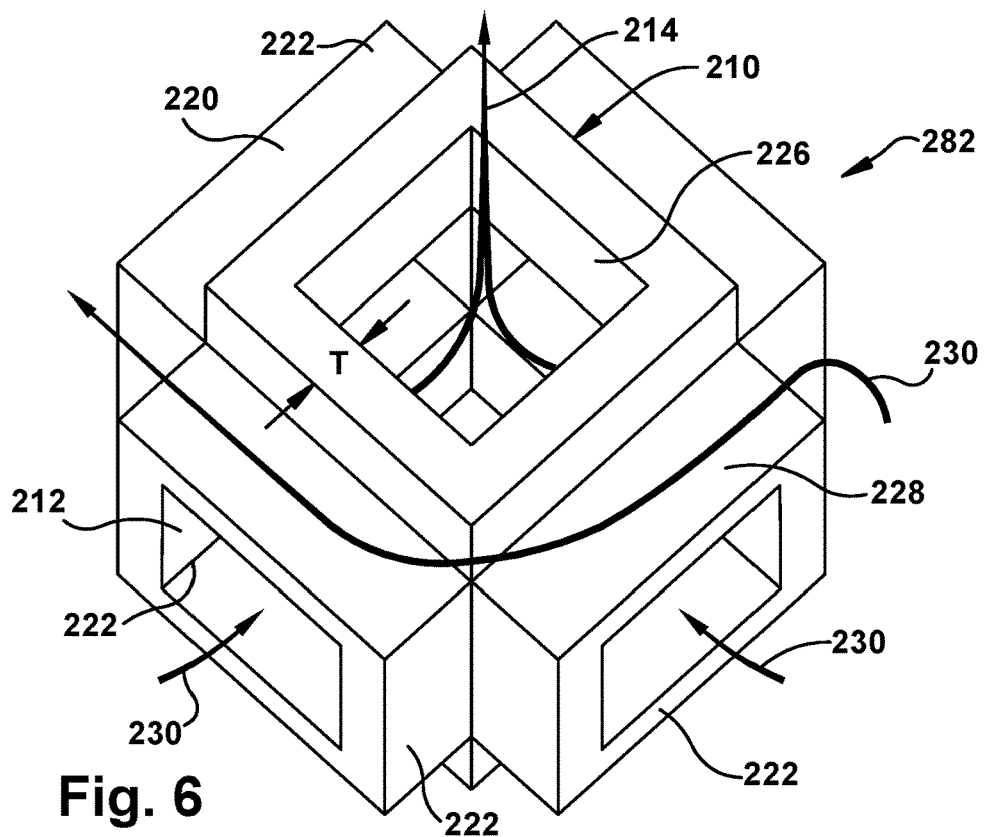
FIG. 6 shows a perspective view of an illustrative planar trifurcated unit cell for use in a cooling structure according to embodiments of the disclosure.
Figure 7:
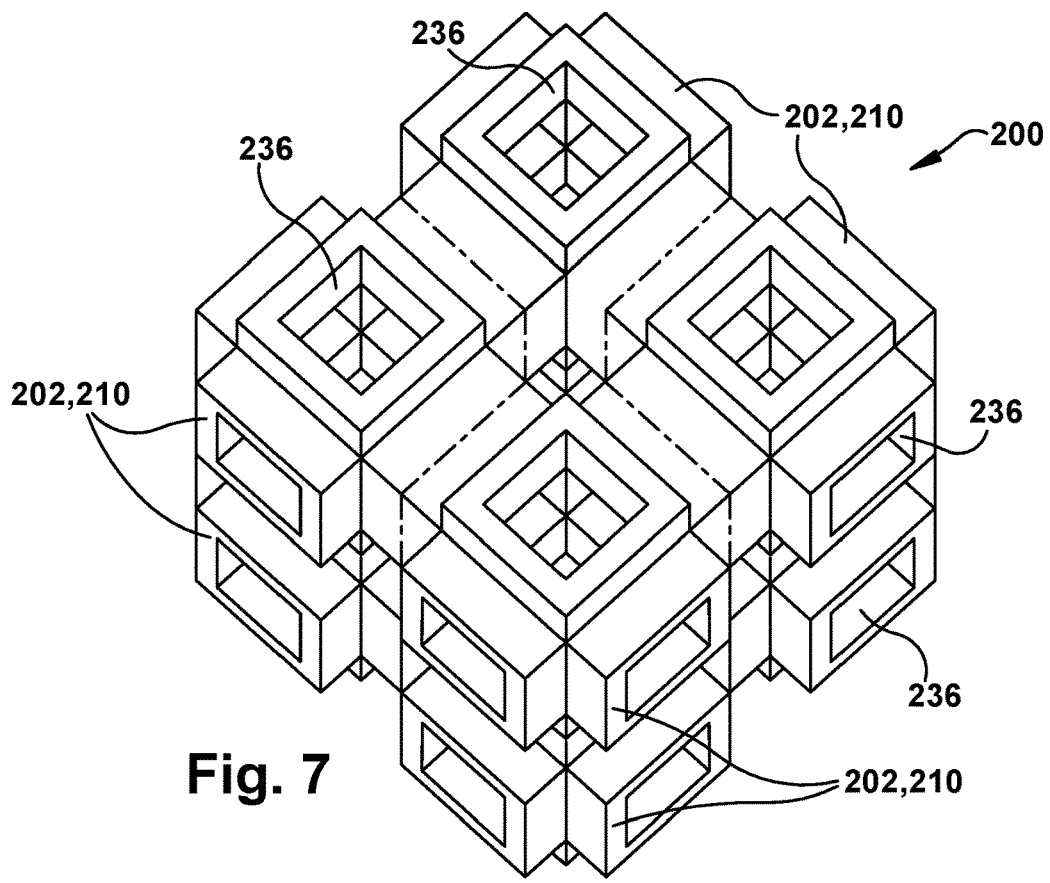
FIG. 7 shows a perspective view of a plurality of 3D unit cells from FIG. 6 for use in a cooling structure according to embodiments of the disclosure.

In contrast to conventional tip rail cooling structures, cooling structure 200 includes a plurality of repeating, three dimensional (3D) unit cells 202. As will be described herein, 3D unit cells 202 can take a variety of forms according to embodiments of the disclosure. FIG. 6 shows a perspective view of an illustrative 3D unit cell 202 in the form of a planar trifurcating unit cell 210; and FIG. 7 shows a perspective view of a portion of cooling structure 200 including a plurality of connected planar trifurcating unit cells 210. As shown best in FIG. 6, each 3D unit cell 202 includes a flow passage 212 defined therein that is in fluid communication with flow passage(s) 212 of at least one other 3D unit cell 202. Collectively, flow passages 212 of plurality of repeating, 3D unit cells 202 create a tortuous cooling passage 214 in portion of tip rail 150 in which they are employed as cooling structure 200.

In FIG. 6, each planar trifurcating unit cell 202 includes a side wall 220 defining a plurality of unit cell inlets/outlets 222, an interior surface 226, and an exterior surface 228. In contrast to planar trifurcating unit cells used for heat exchangers, planar trifurcating unit cell 202 includes a single flow passage 212 therein in fluid communication with each inlet/outlet 222. In this fashion, a coolant 230, e.g., air from airfoil chamber 174, may flow into planar trifurcating unit cell 202 through unit cell inlet(s)/outlets 222, contact interior surface 226, and exit out of inlet/outlet(s) 222. Coolant 230 can also flow past unit cell 202 such that coolant 230 contacts exterior surface 228. In the illustrated embodiment, each unit cell 202 has six unit cell inlets/outlets 222. In alternative embodiments, planar trifurcating unit cell 202 has any number of unit cell inlets/outlets 222 that enable coolant 230 to flow therethrough. It is also recognized that coolant 230 flow into inlets/outlets 222 may switch direction, i.e., such that inlets are outlets and outlets are inlets. Walls of unit cell 202 can have thickness T, which can be any amount desired to ensure sufficient rigidity and strength of cooling structure 200.

As observed in FIG. 7, each planar trifurcating unit cell 202 is also in fluid communication with flow passage 212 of at least one other unit cell 202, e.g., each adjacent planar trifurcating unit cell 202. In this manner, coolant 230 can conductively cool all of the fluidly interconnected planar trifurcating unit cells 202 in cooling structure 200, reducing undesirable thermal gradients in tip 190. The furcated shapes of flow passage(s) 212 provide for additional surface area to facilitate heat exchange between coolant 230 and cooling structure 200. 3D unit cells 202 can be customized in size, opening area, etc., to reduce and/or inhibit the formation of thermal boundary layers in coolant 230. In addition, in the illustrative embodiment, flow passage 212 and/or inlet/outlets 222 have a cross-sectional area that is based on flow requirements, such as flow rate, pressure drop, and heat transfer, and/or volume requirements for cooling structure 200. While shown with approximately equal area, inlet/outlets 222 can have different sizes. FIG. 8 shows an illustrative trifurcating 3D unit cell 202 with curved inlet/outlets 222, and having different widths W1, W2.

Inlet/outlets 222 and flow passage 212 may have any cross-sectional area that enable cooling structure 200 to operate as described herein. In the illustrative embodiment of FIG. 6, inlet/outlets 222 have a square cross-sectional shape. In alternative embodiments, inlet/outlets 222 have any cross-sectional shape that enables cooling structure 200 to operate as described herein. For example, in some embodiments, inlet/outlets 222 have any of the following cross-sectional shapes, without limitation: rectangular, diamond, circular, and triangular. Inlet/outlet 222 and flow passage 212 size and/or shape can be tailored to provide more cooling in areas where it is advantageous to do so (e.g., areas with a higher heat load). Moreover, in some embodiments, inlet/outlets 222 include any of the following, without limitation: a fin, a surface having engineered roughness, a surface roughened by manufacturing process, any other heat transfer enhancement, and combinations thereof.

In the illustrative embodiment, the shape and size of 3D unit cells 202 is determined based at least in part on any of the following, without limitation: surface area, pressure drop, compactness of cooling structure 200, coolant flow, and desired local cooling intensity. In the illustrative embodiment in FIG. 7, 3D unit cells 202 have substantially the same shape. In particular, 3D unit cells 202 have a partially cuboid shape. In alternative embodiments, cooling structure 200 includes any 3D unit cells 202 that enable cooling structure 200 to operate as described herein. In some embodiments, cooling structure 200 may include 3D unit cells 202 that differ in configuration from each other. In further embodiments, the shape of 3D unit cells 202 at least partially conforms to a shape of cooling structure 200 and/or adjacent structure. For example, in some embodiments, 3D unit cells 202 are at least partially curved to align with an annular shape of tip rail 150, e.g., following pressure side wall 128 or suction side wall 130.

In some embodiments, at least a portion of 3D unit cells 202 are flexible to facilitate unit cells 202 shifting in response to characteristics of coolant 230 such as pressure, flow rate, volume, and density, or to absorb rub with shroud 120. For example, in some embodiments, side walls 220 are flexible and adjust to attenuate coolant surge. In the illustrative embodiment, side walls 220 of 3D unit cells 202 are substantially rigid. In alternative embodiments, 3D unit cells 202 have any amount of flexibility that enables cooling structure 200 to operate as described herein. That is, cooling structure 200 and 3D unit cells 202 have sufficient strength to withstand rub against shroud 120, and other environmental conditions.

Returning to FIG. 5, in operation, hot gases pass through gap 244 and into tip pocket 155. Coolant 230 simultaneously enters cooling structure 200, e.g., via connector passages 204 to airfoil chamber 174. Coolant 230 can move through tortuous cooling passage 214 created by cooling structure 200, and in particular, the plurality of 3D unit cells 202. Tip rail 150, i.e., cooling structure 200 in this embodiment, may have any shape desired. Since cooling structure 200 includes flow passages 212 of plurality of repeating, 3D unit cells 202 that are not closed off, as shown for example in FIG. 7, 3D unit cells 202 create a plurality of cooling passage openings 236 where cooling structure 200 is not otherwise closed off, e.g., by a wall or other structure. In this fashion, coolant 230 can escape cooling structure 200 to provide cooling in areas typically not cooled in a tip. For example, in FIG. 5, cooling structure 200 is shown to replace solid inner rail surface 157 (FIG. 3) and solid outer rail surface 159 (FIG. 3), thus also providing cooling passage openings 236 in faces where those solid surfaces normally would be present. In this fashion, coolant 230 can escape cooling structure 200 to provide cooling in other areas, e.g., as film cooling on tip plate 148. Also, cooling structure 200 provides a plurality of cooling passage openings 236 in at least a radially outward facing rail face 260 of the portion of tip rail 190. Due to the number of cooling passage openings 236, clogging of cooling structure 200 from dust, etc., is unlikely. Furthermore, the number of cooling passage openings 236 enables a more continuous distribution of film cooling fluid in at least a radially outward facing rail face 260 of the portion of tip rail 190, which may reduce unwanted thermal gradients in tip rail 190.

Referring to FIGS. 9-16, a variety of alternative embodiments of 3D unit cells 202 are illustrated. While particular forms of 3D unit cells 202 are illustrated, it is emphasized that the teachings of the disclosure can be applied to a wide variety of other 3D unit cells 202. For example, FIG. 9 shows a curved trifurcating 3D unit cell 202, which is similar to that shown in FIG. 6 but includes curved walls. FIG. 10 shows a cooling structure 200 including a plurality of curved trifurcating 3D unit cells 202C as in FIG. 9.

Figure 12:
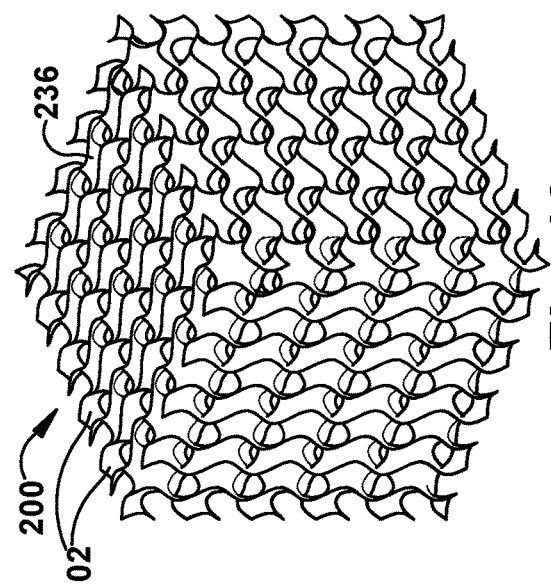
FIG. 12 shows a perspective view of a cooling structure with a 3D unit cell in the form of a diamond triply periodic minimal surface.
Figure 13:
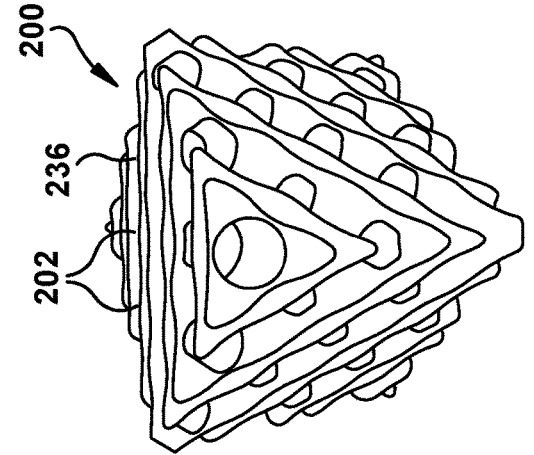
FIG. 13 shows a perspective view of a cooling structure with a 3D unit cell in the form of a gyroid triply periodic minimal surface.
Figure 16:
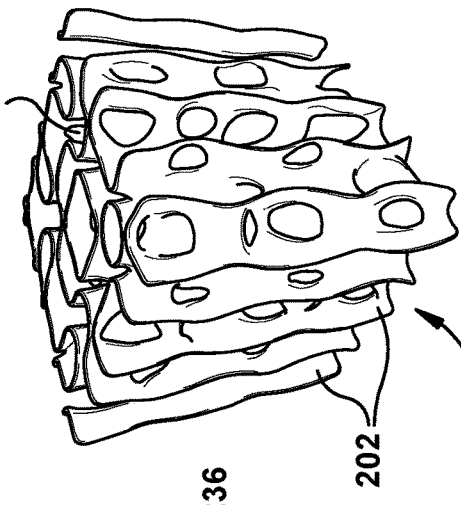
FIG. 16 shows a perspective view of a cooling structure with a 3D unit cell in the form of a PW hybrid triply periodic minimal surface.
Figure 15:
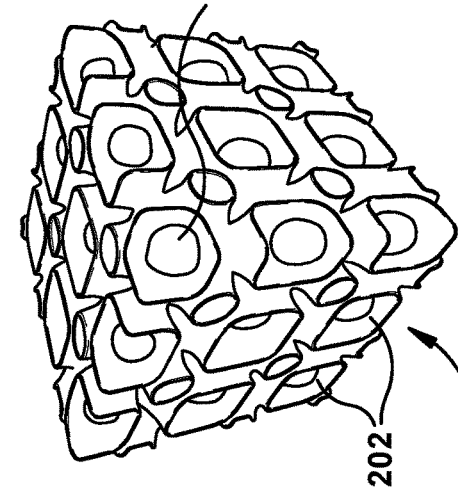
FIG. 15 shows a perspective view of a cooling structure with a 3D unit cell in the form of a Schoen I-WP triply periodic minimal surface.
Figure 11:
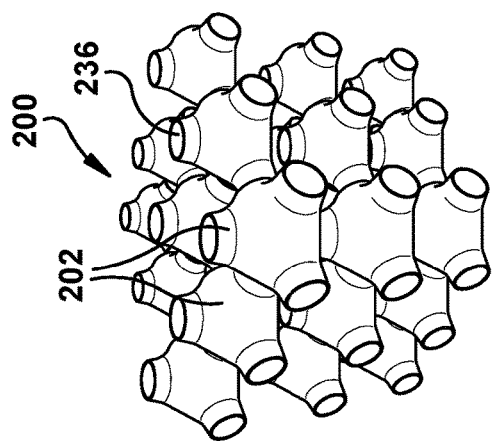
FIG. 11 shows a perspective view of a cooling structure with a 3D unit cell in the form of a Schwarz P triply periodic minimal surface.
Figure 14:
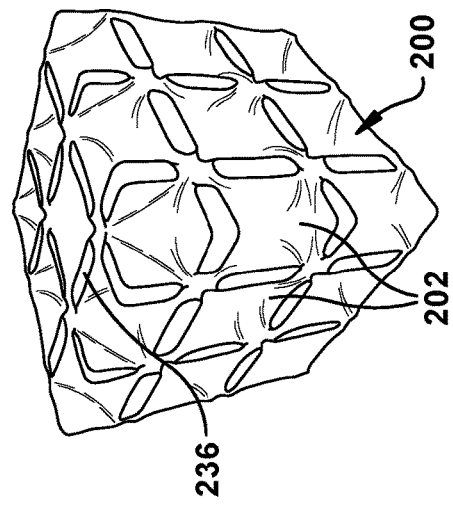
FIG. 14 shows a perspective view of a cooling structure with a 3D unit cell in the form of a neovius triply periodic minimal surface.

FIGS. 11-16 show embodiments in which each of the plurality of repeating, 3D unit cells 202 include a triply periodic minimal surface. A "minimal surface" is a surface that is locally area-minimized such that a piece thereof has the smallest surface area possible spanning a boundary of that piece. "Triply periodic minimal surfaces" repeat themselves in three dimensions in a crystalline structure format. Embodiments of the disclosure can employ any of a large variety of triply periodic minimal surfaces capable of operation as described herein, e.g., they have sufficient strength, flow characteristics and environmental stability to be employed in tip rail 150. FIG. 11 shows cooling structure 200 with a 3D unit cell 202 in the form of a Schwarz P triply periodic minimal surface. FIG. 12 shows cooling structure 200 with a 3D unit cell 202 in the form of a diamond triply periodic minimal surface. FIG. 13 shows cooling structure 200 with a 3D unit cell 202 in the form of a gyroid triply periodic minimal surface. FIG. 14 shows cooling structure 200 with a 3D unit cell 202 in the form of a neovius triply periodic minimal surface. FIG. 15 shows cooling structure 200 with a 3D unit cell 202 in the form of a Schoen I-WP triply periodic minimal surface. FIG. 16 shows cooling structure 200 with a 3D unit cell 202 in the form of a PW hybrid triply periodic minimal surface. The triply periodic unit cells can repeat as many times a necessary to form cooling structure 200. Any of 3D unit cells 202 can be readily additive manufactured.

Figure 17:
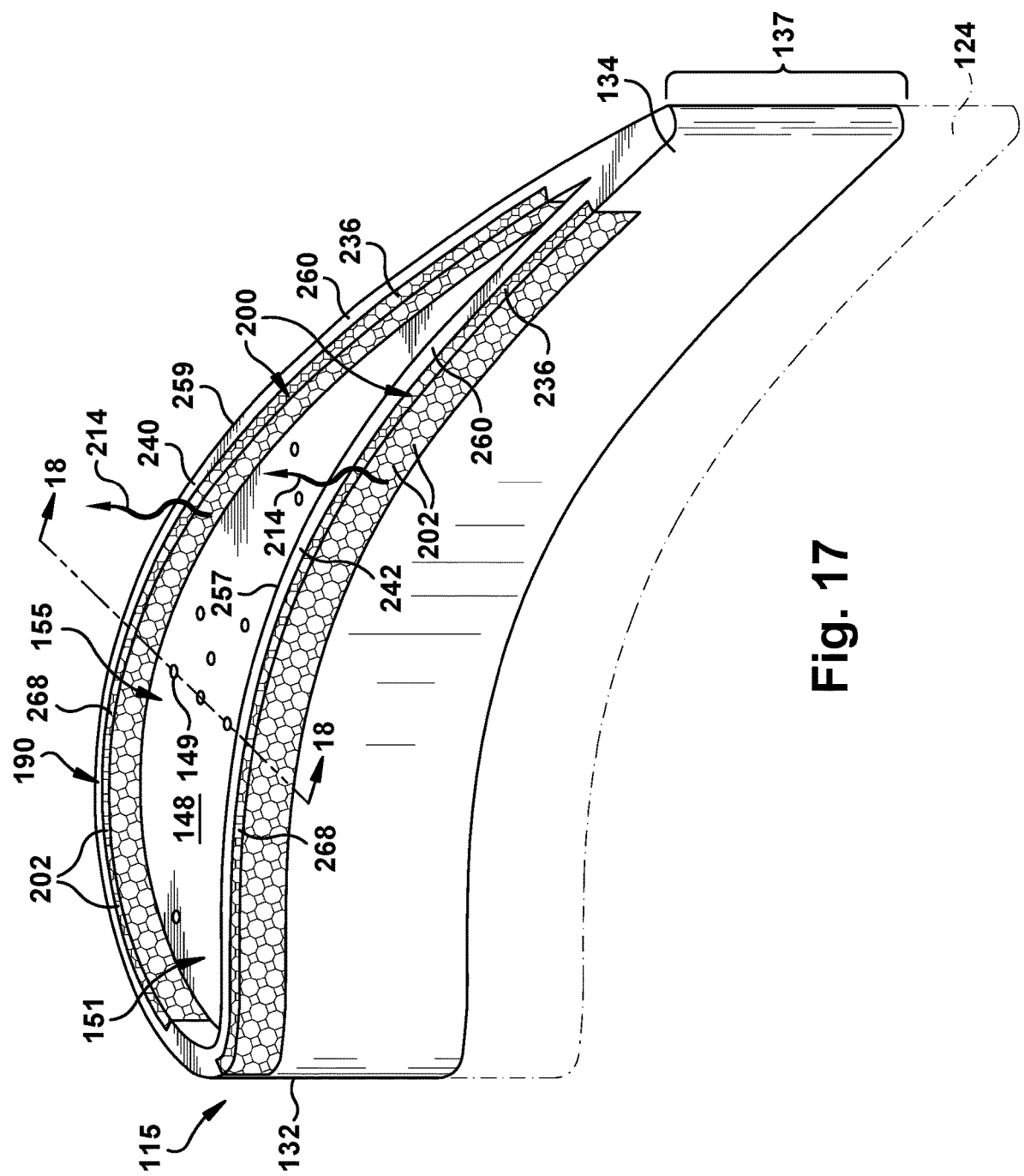
FIG. 17 shows a perspective view of a turbomachine component, turbine rotor blade and tip including a cooling structure including repeated 3D unit cells according to another embodiment of the disclosure.
Figure 18:
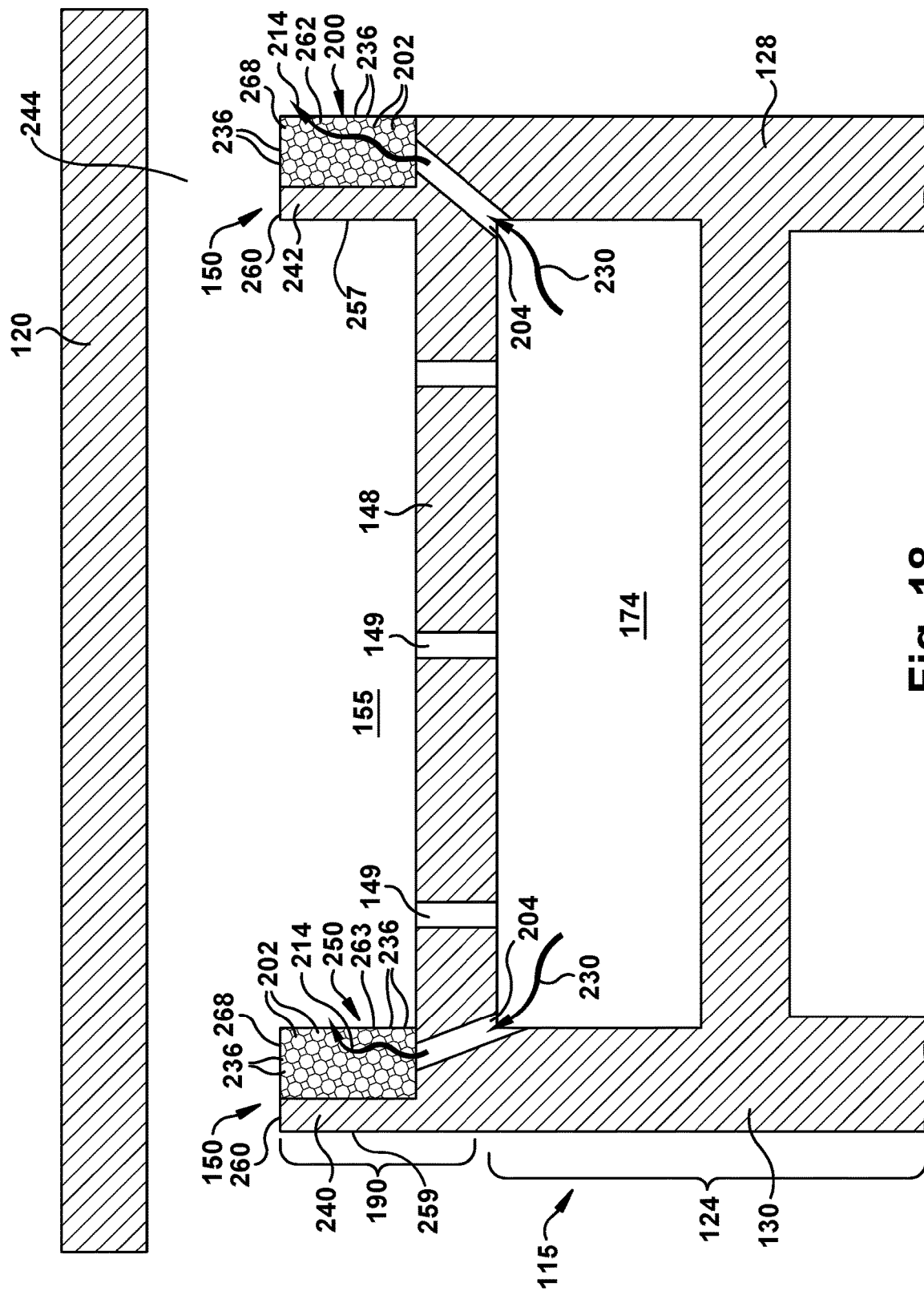
FIG. 18 shows a partial cross-sectional view along line 18-18 of the tip in FIG. 17.

Referring to FIGS. 17-21, cooling structure 200 may constitute a variety of different portions, and be positioned in a variety of different locations, in tip rail 150. FIG. 17 shows a perspective view of tip 190, and FIG. 18 shows a cross-sectional view of tip 190 along line 18-18 in FIG. 17, according to another embodiment of the disclosure. In FIG. 17, tip rail 190 includes an external tip rail suction side wall rail 240 extending radially from tip plate 148 along at least a portion of suction side wall 130 of airfoil 124. Tip rail 190 also includes a tip rail internal pressure side wall rail 242 extending radially from tip plate 148 and paralleling at least a portion of pressure side wall 128 of airfoil 124. Each side wall rail 240, 242 may extend along any desired portion of each respective airfoil side wall 128, 130. Pressure side wall rail 242 may include an inner rail surface 257, and suction side wall rail 240 may have an outer rail surface 259, and each have a radially outward facing rail surface 260. In this embodiment, cooling structure 200 is positioned inwardly of suction side wall rail 240 and externally of pressure side wall rail 242. Cooling passage openings 236 are provided in: a radially outward facing rail face 268 along both side wall rails 240, 242, a tip-pocket-facing tip pocket facing side wall face 263 and a pressure side wall facing face 262, of cooling structure 200. Side wall rails 240, 242 can direct coolant 230, e.g., by preventing it from passing out of cooling structure 200 where side wall rails 240, 242 are present. In this embodiment, the shape of 3D unit cells 202 may at least partially conform to a shape of tip rail external and internal side wall rails 240, 242. For example, 3D unit cells 202 may be at least partially curved to align with side wall rails 240, 242.

Figure 19:
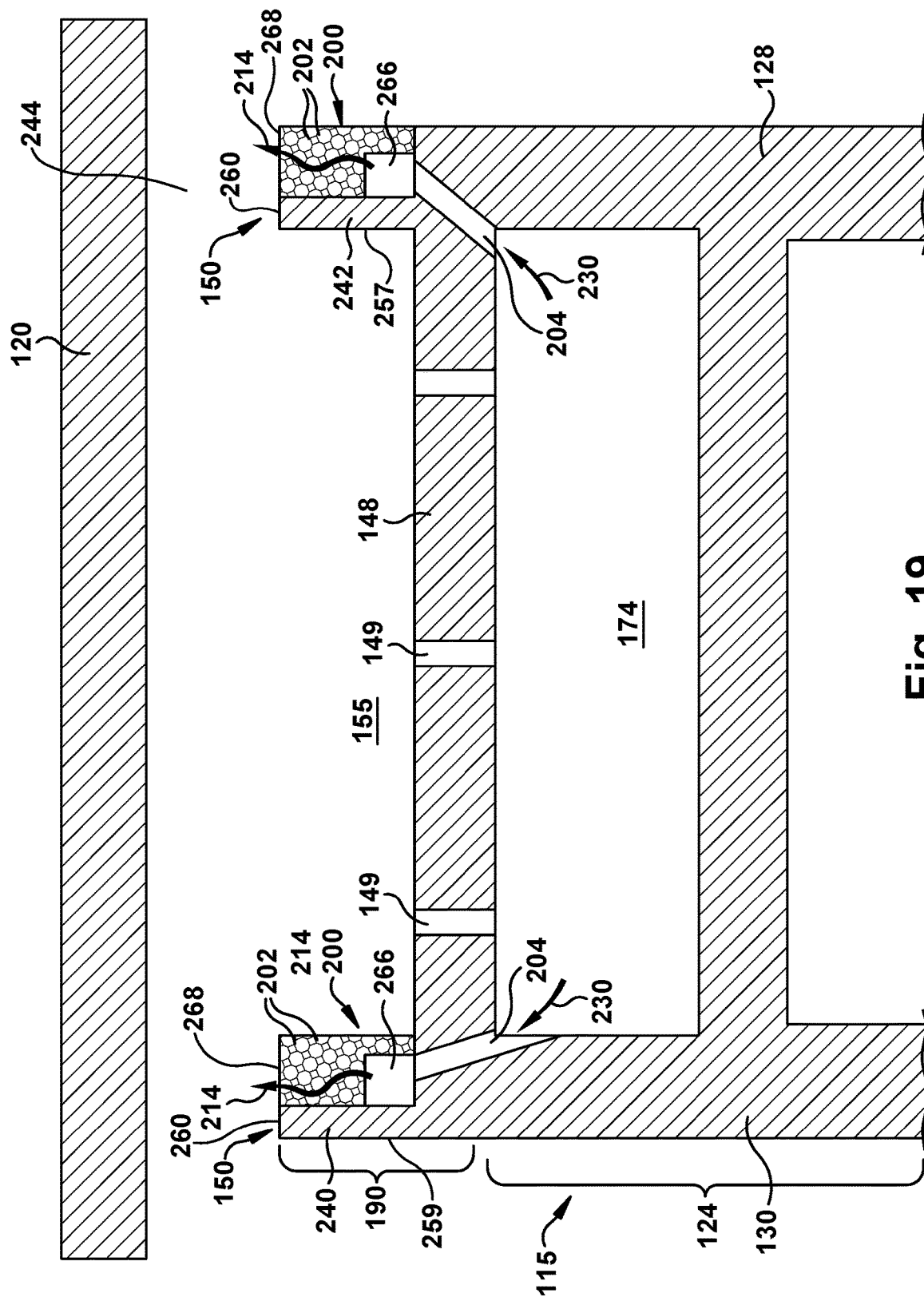
FIG. 19 shows a cross-sectional view of a tip including a cooling structure including repeated 3D unit cells according to another embodiment of the disclosure.

FIG. 19 shows a cross-sectional view of tip 190 according to another embodiment of the disclosure. In FIG. 19, tip rail 190 has substantially the same configuration as in FIG. 18, except cooling structure 200 also includes a plenum 266 in fluid communication with connector passage 204. Plenum 266 may include any form of opening that provides distribution of coolant 230 within tip rail 190 and/or cooling structure 200. For example, plenum 266 may run into and out of the page in FIG. 19 to deliver coolant 230 along a length of cooling structure 200. Plenum 266 can have any desired cross-sectional shape and/or area.

Figure 20:
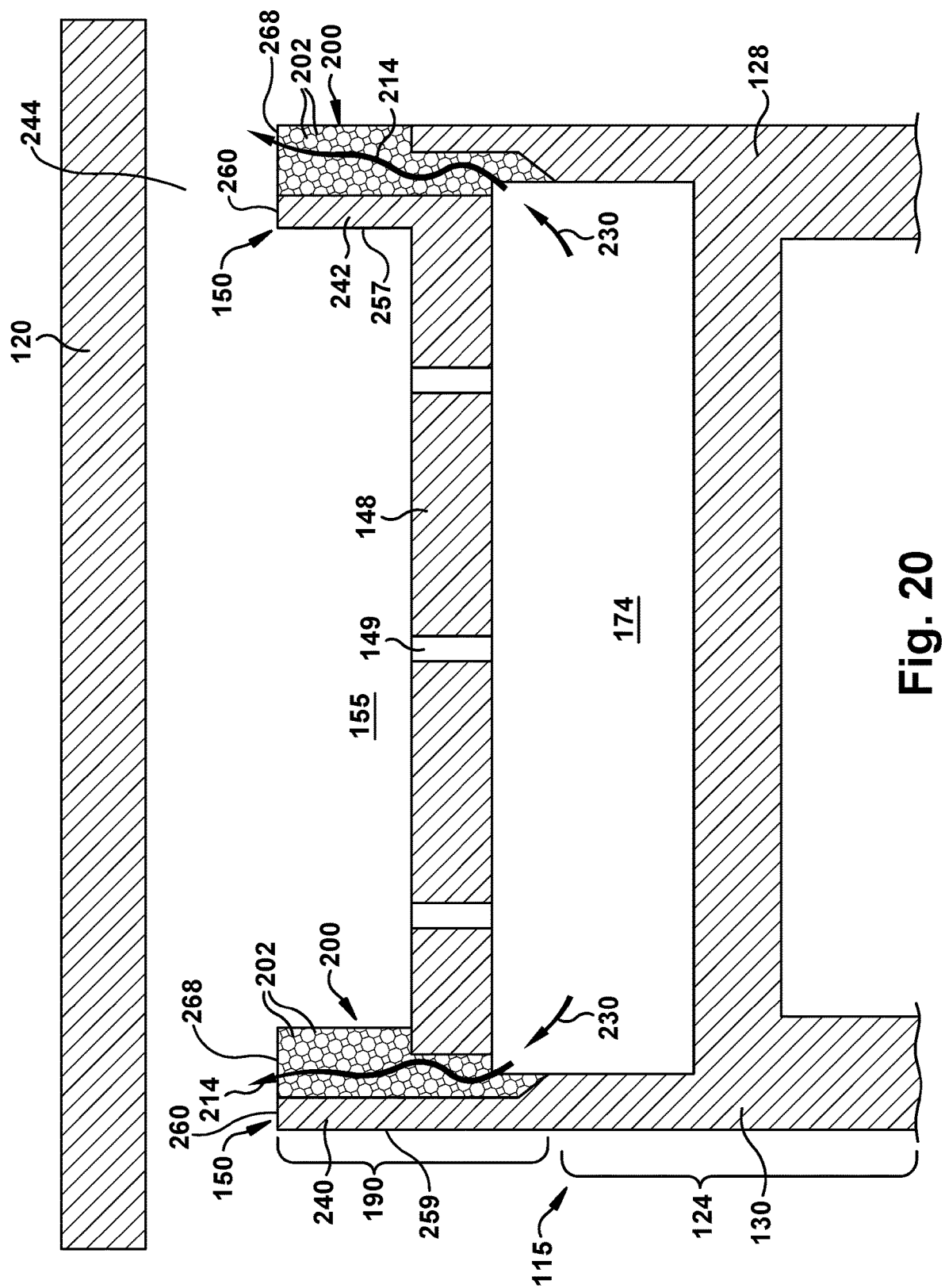
FIG. 20 shows a cross-sectional view of a tip including a cooling structure including repeated 3D unit cells according to another embodiment of the disclosure.

FIG. 20 shows a cross-sectional view of tip 190 according to yet another embodiment of the disclosure. Here, cooling structure 200 has substantially the same configuration as in FIG. 18, except it also extends through at least one of tip plate 148, pressure side wall 128 and/or suction side wall 130, to fluidly communicate with airfoil chamber 174. More particularly, cooling structure 200 is formed within tip plate 148, pressure side wall 128 and/or suction side wall 130, replacing connector passage 204 (FIG. 19), to fluidly communicate with airfoil chamber 174. Cooling structure 200 can be formed in this manner, for example, using additive manufacturing. Here, tortuous cooling passage 214 extends to airfoil chamber 174.

Figure 21:
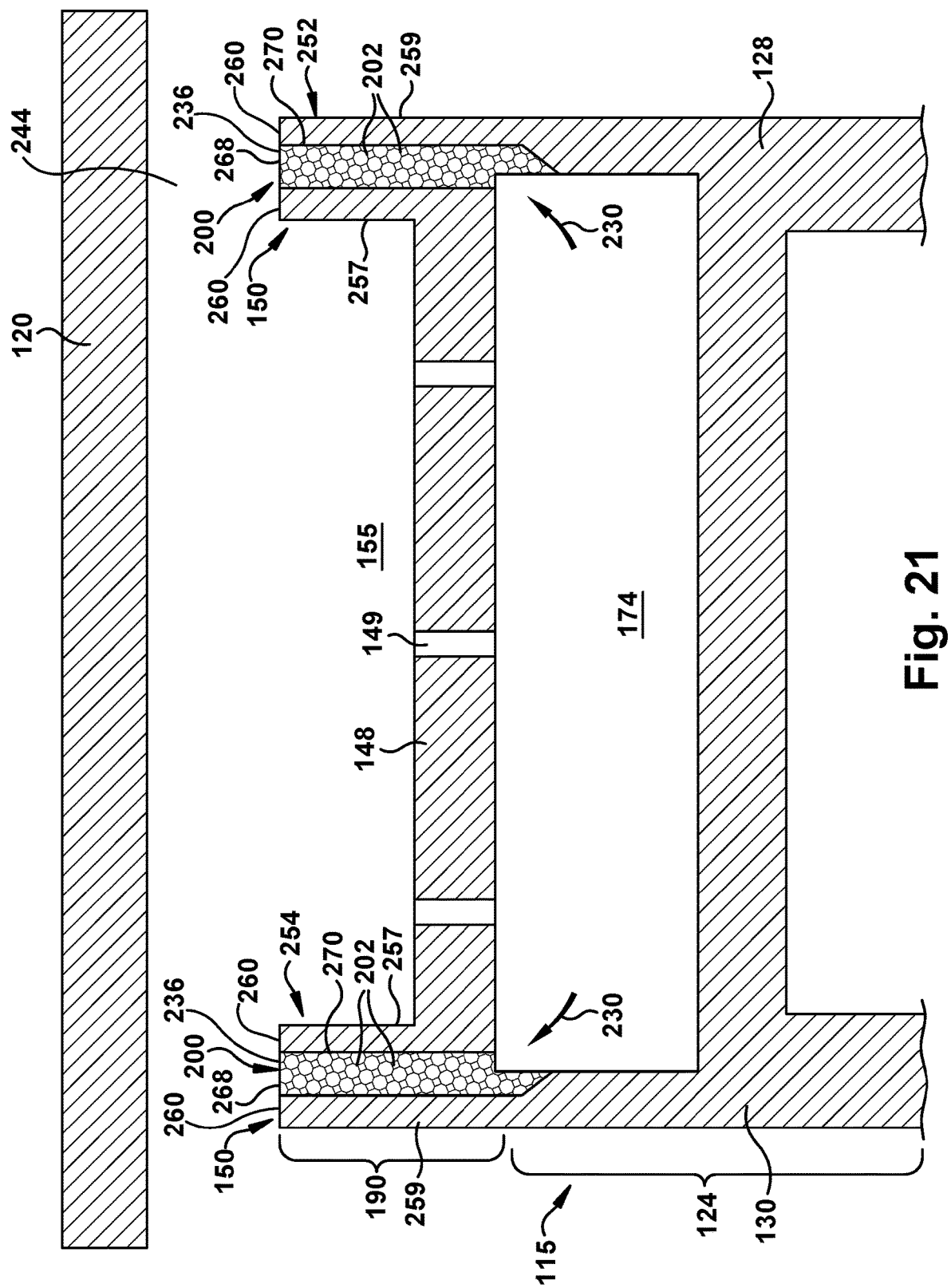
FIG. 21 shows a cross-sectional view of a tip including a cooling structure including repeated 3D unit cells according to another embodiment of the disclosure.

FIG. 21 shows a cross-sectional view of tip 190 according to yet another embodiment of the disclosure. In this example, tip rail 190 includes a pressure side wall rail 252 and a suction side wall rail 254. Pressure side wall rail 252 coincides with pressure side wall 128 and suction side wall rail 254 coincides with suction side wall 130 of airfoil 124. Wall rails 252, 254 may join at or near leading edge 132 (FIG. 3) in a known fashion. Generally, pressure side wall rail 252 extends radially outwardly from tip plate 148 and may extend from leading edge 132 (FIG. 3) to trailing edge 134 (FIG. 3) of airfoil 124. As illustrated, the path of pressure side wall rail 252 is adjacent to or near the outer radial edge of pressure side wall 128 (i.e., at or near the periphery of tip plate 148 such that it aligns with the outer radial edge of the pressure side wall 128). Similarly, as illustrated, suction side wall rail 254 extends radially outwardly from tip plate 148 and may extend from leading edge 132 (FIG. 3) to trailing edge 134 (FIG. 3) of airfoil 124. The path of suction side wall rail 254 is adjacent to or near the outer radial edge of suction side wall 130 (i.e., at or near the periphery of the tip plate 148 such that it aligns with the outer radial edge of the suction side wall 130). It should be understood that wall rails 252, 254 may not fully follow the pressure or suction side walls 128, 130. That is, in alternative types of tips in which the present disclosure may be used, wall rails 252, 254 may be moved away from the edges of tip plate 148 and may not extend to trailing edge 134 (FIG.

3). Both pressure side wall rail 252 and suction side wall rail 254 may be described as having an inner rail surface 257, an outer rail surface 259 and a radially outward facing rail surface 260. That is, they are solid surfaces. In contrast to FIG. 3, cooling structure 200 is positioned in a radially outward facing channel 270 within at least one of pressure side wall rail 252 and suction side wall rail 254 (shown as both, but could be one or the other). Plurality of cooling passage openings 236 may be provided in radially outward facing rail face 268 of cooling structure 200 in radially outward facing channel 270. FIG. 21 also shows cooling structure 200, as in FIG. 20, extend through at least one of tip plate 148, pressure side wall 128 and/or suction side wall 130, to fluidly communicate with airfoil chamber 174. More particularly, cooling structure 200 is formed within tip plate 148, pressure side wall 128 and/or suction side wall 130, replacing connector passage 204 (FIG. 19), to fluidly communicate with airfoil chamber 174.

Figure 22:
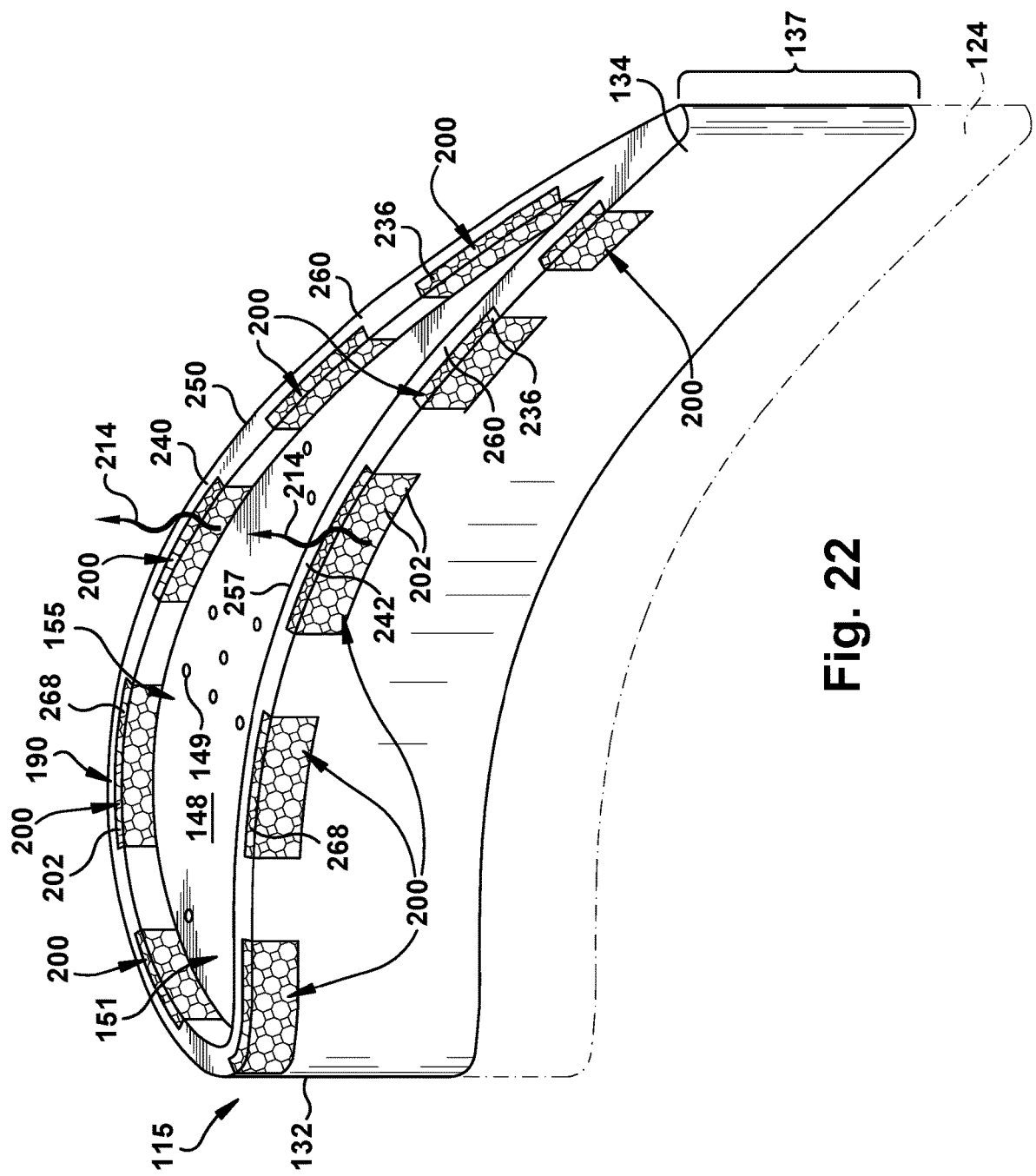
FIG. 22 shows a perspective view of a turbomachine component, turbine rotor blade and tip including an intermittent cooling structure including repeated 3D unit cells according to another embodiment of the disclosure.

Referring to FIG. 22, while embodiments of the disclosure have been illustrated with cooling structure 200 extending continuously along at least a portion of pressure side wall 128 and/or suction side wall 130, a number of cooling structures 200 can be formed along side wall(s) 128, 130, i.e., in an intermittent fashion with solid walls therebetween. While a particular layout has been illustrated (similar to FIG. 17), it is understood that intermittent formation can be applied to any of the embodiments described herein.

As noted, cooling structure 200 can be formed in using additive manufacturing. In this fashion, cooling structure 200 can be formed integrally with a rest of a tip 190, turbine rotor blade 115 or turbine component. Tip 190 may be made separately and coupled in a known fashion to the rest of turbine rotor blade 115.

Embodiments of the disclosure provide a turbine component, tip 190 or turbine rotor blade 115 including cooling structure 200 constituting at least a portion of tip rail 150 thereof. Cooling structure 200 is in fluid communication with airfoil chamber 174 for delivery of coolant 230 therethrough. Cooling structure 200 includes plurality of repeating, 3D unit cells 202. Flow passages 212 of the plurality of repeating, 3D unit cells 202, collectively, create tortuous cooling passage 214 in the at least the portion of tip rail 150. As described, 3D unit cells 202 can be positioned in any of a number of locations relative to tip rail 150, allowing for more effective cooling and customization of the location of the cooling. The axial extent, i.e., length along side walls 128, 130, to which cooling structure 200 extends within tip rail 150 can be customized to provide the desired cooling. More efficient cooling allows for increased firing temperatures or reduced coolant flow. The potential for reduced tip rail temperatures also may increase part life. Advantageously, cooling structure 200 is capable of additive manufacturing, with or separately from the rest of the turbine component, turbine rotor blade or tip. Cooling structure 200 also addresses dust clogging by providing many cooling passage openings 236 in at least a radially outward facing rail face 260, 268 of tip rail 150. Despite providing the afore-mentioned cooling advantages, cooling structure 200 maintains the structural strength of the tip rail.

Turbine component, turbine rotor blade 115, and/or tip 190 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine component, comprising:
   an airfoil having a base, a tip disposed opposite the base, and a pressure side wall and a suction side wall extending between a leading edge and a trailing edge thereof;
   an airfoil chamber disposed within the airfoil, the airfoil chamber configured to supply a coolant through the airfoil;
   a tip plate at a tip end of the airfoil chamber;

a tip rail extending radially from the tip plate, the tip rail disposed near or at a periphery of the tip plate, the tip rail includes an external tip rail suction side wall rail, an internal pressure side wall rail, and a radially outward facing tip rail face; and a cooling structure constituting at least a portion of the tip rail, the cooling structure in fluid communication with the airfoil chamber, the cooling structure including a plurality of repeating, three-dimensional unit cells, each unit cell defining a single flow passage that is in fluid communication with the single flow passage of at least one other unit cell, wherein the flow passages of the plurality of repeating, three-dimensional unit cells create a tortuous cooling passage in the at least the portion of the tip rail, and wherein each of the plurality of repeating, three-dimensional unit cells include one of a planar trifurcating unit cell or a curved trifurcating unit cell, and further wherein the flow passages of the plurality of repeating, three-dimensional unit cells provide a plurality of cooling passage outlets, the plurality of cooling passage outlets including outlets at the external tip rail suction side wall rail and at at least one of the radially outward facing tip rail face and the internal pressure side wall rail.

2. The turbine component of claim 1, wherein each of the plurality of repeating, three-dimensional unit cells includes a triply periodic minimal surface.

3. The turbine component of claim 2, wherein the triply periodic minimal surface is selected from the group consisting of: Schwarz P, diamond, gyroid, neovius, Schoen I-WP, and PW hybrid.

4. The turbine component of claim 1, wherein the at least the portion of the tip rail includes an entirety of the tip rail extending radially from the tip plate.

5. The turbine component of claim 1, wherein the tip rail includes an external tip rail suction side wall extending radially from the tip plate along at least a portion of the suction side wall of the airfoil, and a tip rail internal pressure side wall extending radially from the tip plate and paralleling at least a portion of the pressure side wall of the airfoil, and wherein the cooling structure is positioned inwardly of the external tip rail suction side wall and externally of the tip rail internal pressure side wall.

6. The turbine component of claim 5, further comprising a connector passage fluidly coupling the airfoil chamber and the cooling structure.

7. The turbine component of claim 6, further comprising a plenum in the cooling structure in fluid communication with the connector passage.

8. The turbine component of claim 5, wherein the cooling structure extends through at least one of the tip plate, the pressure side wall or the suction side wall, to fluidly communicate with the airfoil chamber.

9. The turbine component of claim 1, wherein the tip rail includes a pressure side wall rail and a suction side wall rail,
wherein the cooling structure is positioned in a radially outward facing channel within at least one of the pressure side wall rail and the suction side wall rail.

10. The turbine component of claim 1, wherein the cooling structure extends through at least one of the tip plate, the pressure side wall or the suction side wall, to fluidly communicate with the airfoil chamber.

11. The turbine component of claim 1, wherein the flow passages of the plurality of repeating, three-dimensional unit cells create a plurality of cooling passage openings in at least a radially outward facing rail face of the at least the portion of the tip rail.

12. The turbine component of claim 1, further comprising a connector passage fluidly coupling the airfoil chamber and the cooling structure.

13. The turbine component of claim 1, further comprising a plenum in at least one of the cooling structure in the tip rail or in the tip rail, wherein the plenum is in fluid communication with the airfoil chamber.

14. A turbine rotor blade for a gas turbine engine, the turbine rotor blade comprising:
an airfoil having a base, a tip disposed opposite the base, and a pressure side wall and a suction side wall extending between a leading edge and a trailing edge thereof;
an airfoil chamber disposed within the airfoil, the airfoil chamber configured to supply a coolant through the airfoil;
a tip plate at a tip end of the airfoil chamber;
a tip rail extending radially from the tip plate, the tip rail disposed near or at a periphery of the tip plate, the tip rail includes an external tip rail suction side wall rail, an internal pressure side wall rail, and a radially outward facing tip rail face; and
a cooling structure constituting at least a portion of the tip rail, the cooling structure in fluid communication with the airfoil chamber, the cooling structure including a plurality of repeating, three-dimensional unit cells, each unit cell defining a single flow passage that is in fluid communication with the single flow passage of at least one other unit cell,
wherein the flow passages of the plurality of repeating, three-dimensional unit cells create a tortuous cooling passage in the at least the portion of the tip rail, and wherein each of the plurality of repeating, three-dimensional unit cells include one of a planar trifurcating unit cell or a curved trifurcating unit cell, and further wherein the flow passages of the plurality of repeating, three-dimensional unit cells provide a plurality of cooling passage outlets, the plurality of cooling passage outlets including outlets at the external tip rail suction side wall rail and at at least one of the radially outward facing tip rail face and the internal pressure side wall rail.

15. The turbine rotor blade of claim 14, wherein each of the plurality of repeating, three-dimensional unit cells include a triply periodic minimal surface.

16. A tip for a turbine rotor blade for a gas turbine engine, the turbine rotor blade including an airfoil having an airfoil chamber disposed within the airfoil and configured to supply a coolant through the airfoil, the tip comprising:
a tip plate configured to be coupled at a tip end of the airfoil chamber;
a tip rail extending radially from the tip plate, the tip rail disposed near or at a periphery of the tip plate, the tip rail includes an external tip rail suction side wall rail, an internal pressure side wall rail, and a radially outward facing tip rail face; and
a cooling structure constituting at least a portion of the tip rail, the cooling structure in fluid communication with the airfoil chamber, the cooling structure including a plurality of repeating, three-dimensional unit cells, each unit cell defining a single flow passage that is in fluid communication with the single flow passage of at least one other unit cell, wherein the flow passages of the plurality of repeating, three-dimensional unit cells create a tortuous cooling passage in the at least the portion of the tip rail, and wherein each of the plurality of repeating, three-dimensional unit cells include one of a planar trifurcating unit cell or a curved trifurcating unit cell, and further wherein the flow passages of the plurality of repeating, three-dimensional unit cells provide a plurality of cooling passage outlets, the plurality of cooling passage outlets at the external tip rail suction side wall rail, and at at least one of the radially outward facing tip rail face and the internal pressure side wall rail.

17. The tip of claim 16, wherein each of the plurality of repeating, three-dimensional unit cells include a triply periodic minimal surface.

* * * * *